United States Patent
Witt et al.

[11] Patent Number: 5,993,564
[45] Date of Patent: Nov. 30, 1999

[54] PISTON CLEANING AND COATING METHOD AND APPARATUS

[75] Inventors: Matthew J. C. Witt, 3430 Krather Rd., Cleveland, Ohio 44109; Clark B. Langmack, Gates Mills, Ohio

[73] Assignee: Matthew J. C. Witt, Cleveland, Ohio

[21] Appl. No.: 08/797,005

[22] Filed: Feb. 7, 1997

[51] Int. Cl.$^6$ ........................................ B08B 7/00
[52] U.S. Cl. .................. 134/33; 134/26; 134/30; 134/32; 134/34; 134/37; 134/36; 15/104.011; 427/327; 427/372.2
[58] Field of Search .............................. 134/26, 25.4, 30, 134/32, 33, 34, 37, 36, 42, 153, 131, 72; 15/104.011; 427/327, 372.2

[56] References Cited

U.S. PATENT DOCUMENTS

| | | |
|---|---|---|
| 1,947,493 | 2/1934 | Rose et al. . |
| 2,376,945 | 5/1945 | Stine . |
| 3,041,194 | 6/1962 | Rosen et al. . |
| 3,203,321 | 8/1965 | Rosen . |
| 3,295,198 | 1/1967 | Coan . |
| 3,976,809 | 8/1976 | Dowell . |
| 4,665,655 | 5/1987 | Woodard .................. 134/94 X |
| 4,752,535 | 6/1988 | Kvernes . |
| 4,918,806 | 4/1990 | Watanabe et al. . |
| 5,153,032 | 10/1992 | Landers et al. . |
| 5,257,603 | 11/1993 | Bauer et al. . |
| 5,266,142 | 11/1993 | Penrice . |
| 5,357,648 | 10/1994 | Noestheden .................. 15/302 |
| 5,435,872 | 7/1995 | Penrice . |
| 5,455,067 | 10/1995 | Chicatelli et al. . |

OTHER PUBLICATIONS

English translation (8 pages) of Japanese patent document entitled "Method for Applying Coating to a Piston Skirt" dated prior to Nov. 26, 1996 and believed to be a Toyota Corp. Japanese patent having an application date of Jan. 29, 1988 and an issue date of Jun. 27, 1996.

*Primary Examiner*—Jill Warden
*Assistant Examiner*—Alexander Markoff
*Attorney, Agent, or Firm*—Pearne, Gordon, McCoy & Granger LLP

[57] ABSTRACT

A method and apparatus for washing and drying a piston and thereafter coating the piston skirt with a dry film lubricant coating and oven-curing said coating. In the washing and drying operation the piston is carried through the apparatus on a conveyor, is spun while wash solution is sprayed on it, is spun while rinse water is sprayed on it, is spun to throw off rinse water, and has air blown against it to remove moisture from its surface. A flash chamber is used in the curing step.

15 Claims, 5 Drawing Sheets

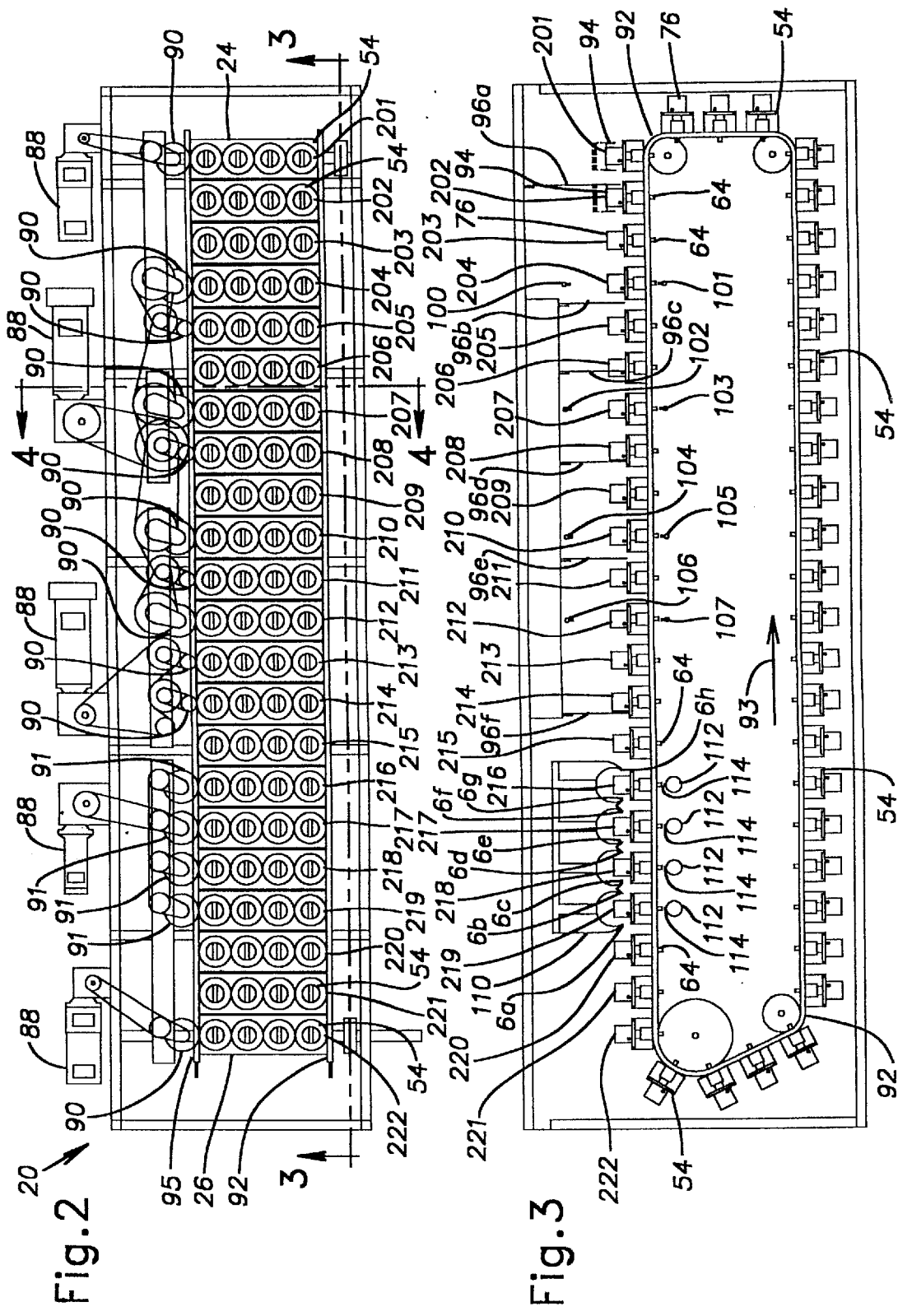

PISTON CLEANING AND COATING METHOD AND APPARATUS

BACKGROUND OF THE INVENTION

The present invention relates generally to a cleaning and coating method and apparatus and more particularly to a method and apparatus for cleaning and coating pistons.

DESCRIPTION OF RELATED ART

In an internal combustion engine, a piston reciprocates inside a cylinder. In order to reduce friction, it is known to coat that part of the piston which contacts the cylinder (the piston sidewall or piston skirt) with a dry film lubricant such as graphite with resin. There are several known methods for applying the dry film lubricant coating onto the piston skirt, including the electrostatic coating method, the dipping method, the spray coating method (air spray or airless spray), the transfer pad printing method, and the screen printing method (silk screen printing method); see U.S. Pat. Nos. 5,435,872; 5,266,142; and 5,257,603, the contents of which are incorporated herein by reference.

As is known, the piston must be washed and dried in preparation for receiving the dry film lubricant coating. In a prior art process, the pistons to be coated are mounted on a track, or are placed into a basket, which travels through a long tunnel. Each piston is mounted on the track such that it may not rotate or spin on its axis but is merely carried along by the track. In the first part of the tunnel, the piston is sprayed with wash water. In the next stage of the tunnel, the piston is sprayed with rinse water. In the prior art process the piston was then dried by baking the wet piston for an effective period of time at a temperature such as 250° F. to drive off the water, or by blowing heated (heated by gas heating, steam heating, or electric resistance heating) air against the piston. The piston was then refrigerated or air conditioned (or left to stand) to cool it down to approximately 90° F. so that the piston could be at the proper temperature for receiving the dry film lubricant coating. The piston was then coated with the dry film lubricant coating and was cured at a single preselected cure temperature for a preselected period of time, such as, for Molykote D-10, 302° F. for 60–120 minutes or 356° F.–375° F. for 30 minutes.

There is a need for a piston cleaning and coating method and apparatus which has a piston washing and drying unit which takes up less valuable floor space in the plant and which utilizes less energy and more efficiently and effectively produces coated pistons.

SUMMARY OF THE INVENTION

The invention includes a method for washing and drying a piston. The method includes the steps of: (a) providing a piston on a conveyor, (b) carrying the piston on the conveyor to a washing area, and (c) at the washing area spraying wash solution on the piston while simultaneously rotating the piston. The method also includes a step of rotating the piston about its longitudinal axis at an effective rotational speed to throw off rinse water. An apparatus to perform the method is also provided. A method of curing a dry film lubricant coating is also provided.

BRIEF DESCRIPTION OF THE DRAWINGS

FIG. 2 is a plan view of a unit for washing and drying pistons prior to a piston coating operation.

FIG. 3 is a sectional view taken along line 3—3 of FIG. 2.

DETAILED DESCRIPTION OF THE PREFERRED EMBODIMENTS OF THE INVENTION

Figure 1:
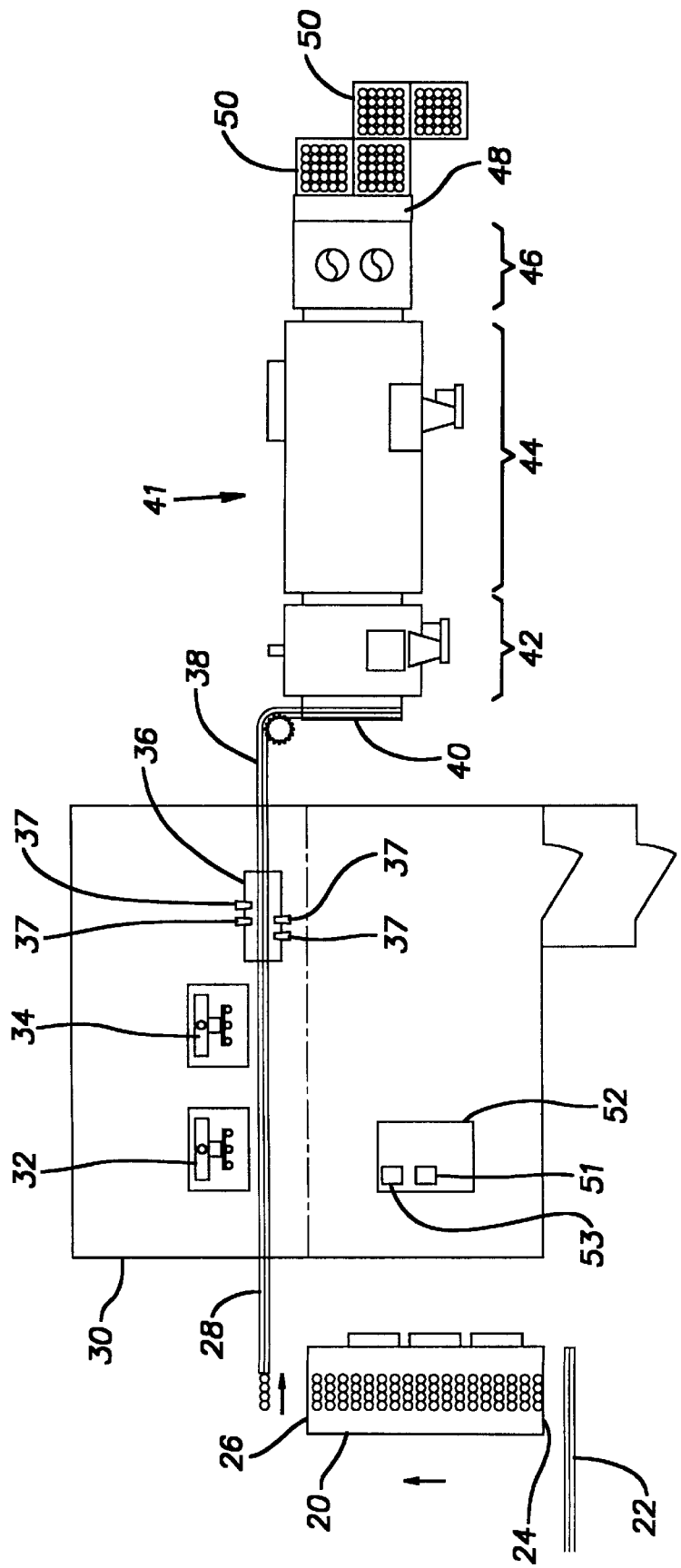
FIG. 1 is a plan view in largely schematic form of a piston cleaning and coating apparatus.
Figure 8:
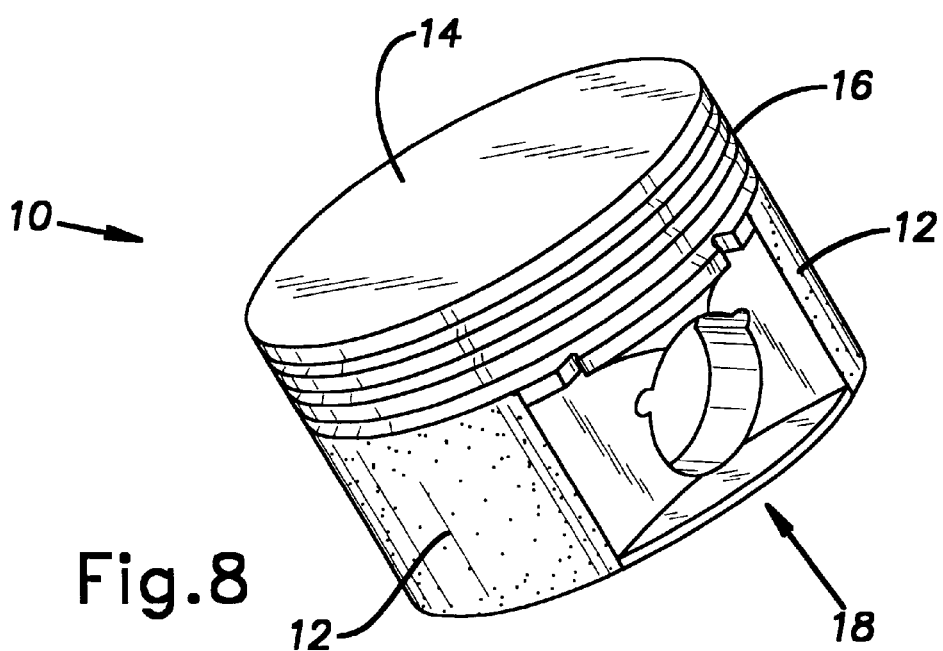
FIG. 8 is a perspective view of a piston.

Generally, the same number is used to identify the same element which appears in different Figures. With reference to FIG. 8, there is shown a representative piston 10 having a sidewall or skirt or exterior skirt surface 12, a top or crown or dome 14, a ring band 16 having grooves for receiving piston rings (not shown), and having a cavity or bottom cavity surface or opening (shown generally at 18) on the bottom of the piston opposite the dome 14. With reference to FIG. 1, there is shown a transfer conveyor 22 for transporting pistons to a piston washing and drying unit 20 which has a loading end 24 and an unloading end 26. After the pistons exit the washing and drying unit 20, they are loaded onto a conveyor 28 for transport into the coating area or coating room 30, which is maintained at positive air pressure and at a preselected temperature and humidity level which is most effective for application of the coating being used. In the coating room, a dry film lubricant, such as Molykote D-10 from Dow-Corning, is applied by a screen application machine or piston coating machine such as a Series 500 FBD/K machine from Europa-Siebdruck-Centrum. Preferably two piston coating machines 32, 34 are utilized, being fed independently from the shuttle/conveyor 28. Less preferably other coating methods known in the art may be utilized.

After the pistons are coated with uncured coating, they are placed back dome down on conveyor 28 or, more preferably, a second corresponding conveyor immediately beneath conveyor 28. The pistons are then carried past a visual inspection station 36, such as an Allen Bradley CVIM II, which includes four cameras 37, two on each side. The cameras 37 will image the coated area and determine if a default is present. Defective parts will then be shunted aside for reprocessing.

The inspected pistons leave the coating room 30 dome down on conveyor 38. From conveyor 38, a number of pistons such as ten pistons are spaced out in a row at loading end 40 for transfer to the belt of the baking or curing oven 41. The ten pistons are pushed forward in formation onto the travelling belt of oven 41. The pistons traverse first into a high-temperature flash chamber 42. The flash chamber is maintained at a preselected temperature and the pistons are baked or maintained at that temperature in the flash chamber for a preselected retention time. The preselected temperature is the maximum or substantially maximum temperature which will not materially affect adversely the curing or performance of the coating. The preselected retention time is the maximum or substantially maximum period of time at the preselected temperature such that the alloy or material of the piston will not reach or exceed the annealing or hardening temperature of the material of the piston. For Molykote D-10 this preselected temperature is about 425° F.

and for a typical aluminum piston as known in the art this preselected retention time at 425° F. is four minutes. The flash chamber quickly drives off the solvents and eliminates cold flow of the coating. Use of the flash chamber has the added benefit of significantly reducing the retention time in the regular or main cure portion of the oven. The pistons proceed from the flash chamber 42 into the main cure chamber 44 where the baking temperature is held at an effective regular cure temperature, such as 375° F., which is substantially below the flash chamber temperature, for a retention time of sixteen minutes, which time is substantially reduced from what it would otherwise be, due to the flash chamber. Upon exit from the main cure chamber 44, the pistons traverse through the cool-down chamber 46 for handling. At the unloading end 48 the coated pistons are or can be automatically loaded into trays 50 for transport to an automotive or similar facility where they are installed.

The cleaning and coating apparatus is preferably completely programmed and controlled through the use of a control computer, such as an Allen Bradley PLC5/40. Remote input/output blocks are used for automation of the system. The master control station 52 preferably contains a touch screen 51 such as an Allen Bradley 1400E and a visual inspection screen 53.

Figure 5:
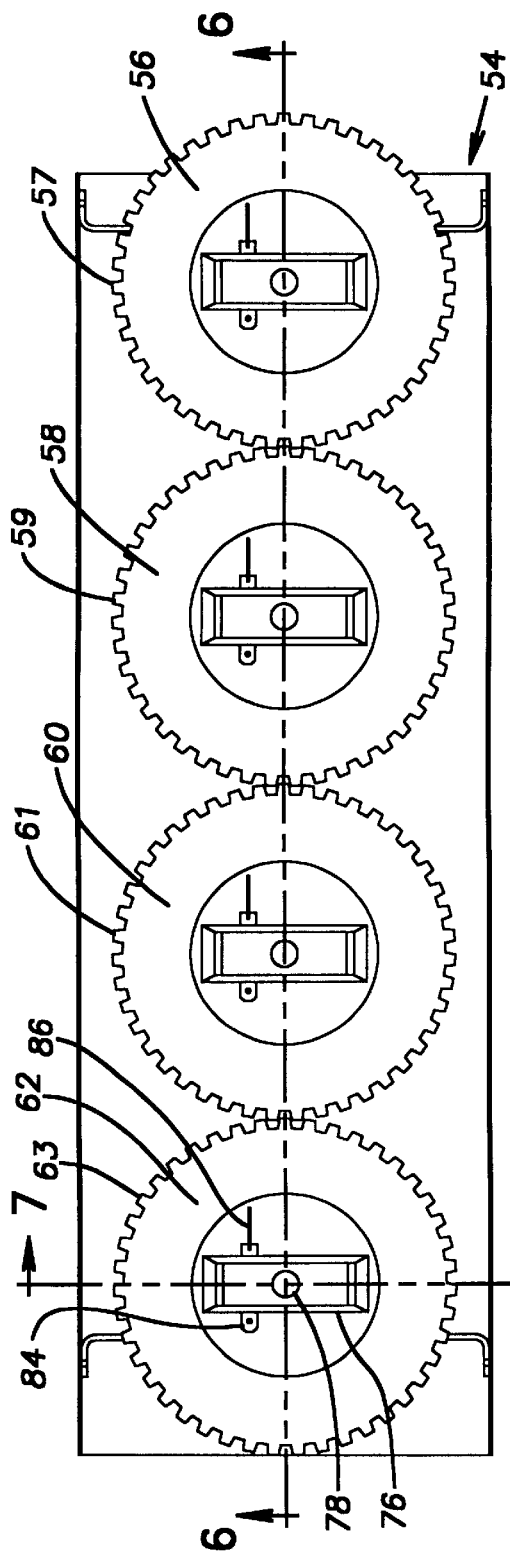
FIG. 5 is a plan view of a piston carrier showing the gears and other features.
Figure 6:
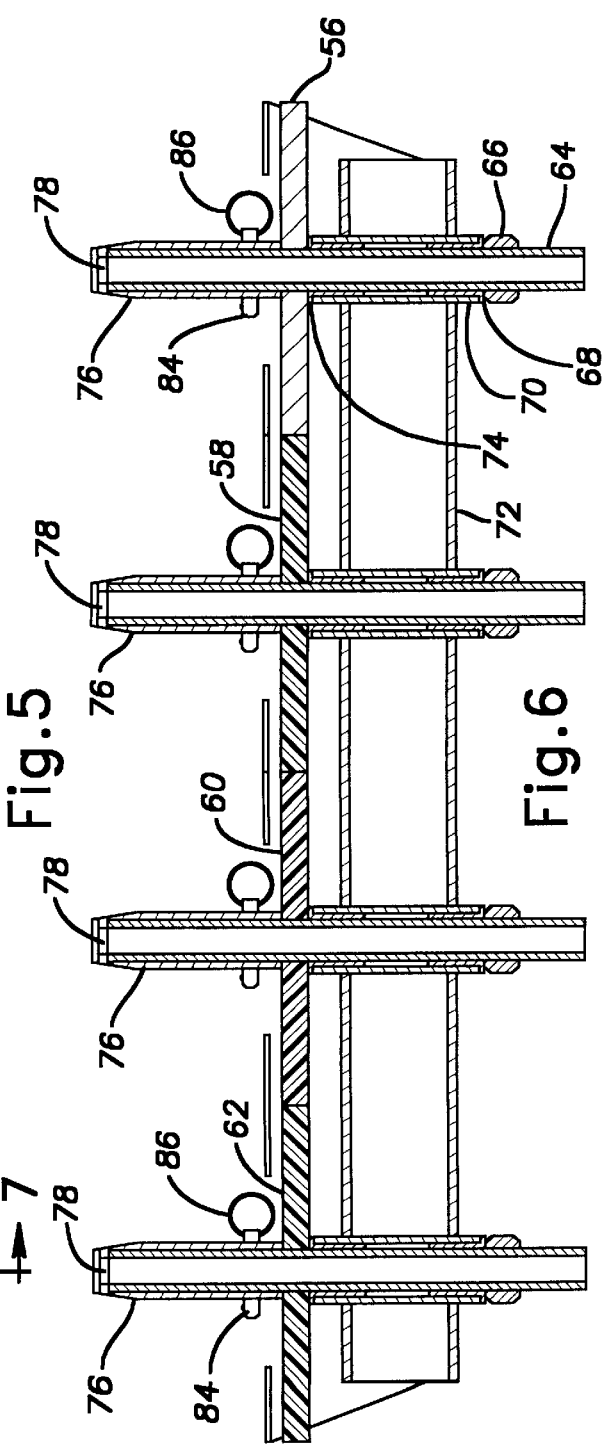
FIG. 6 is a cross-sectional view taken along line 6—6 of FIG. 5.
Figure 7:
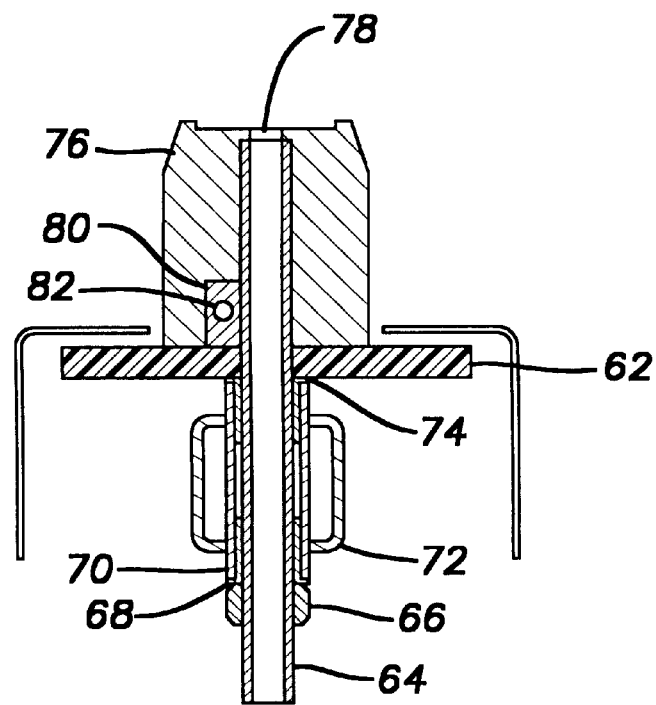
FIG. 7 is a cross-sectional view taken along line 7—7 of FIG. 5.

With reference to FIGS. 5–7, there is shown a carrier 54 which carries four pistons through the washing and drying unit 20. Carrier 54 includes a metal gear 56 (preferably stainless steel) having teeth 57, a plastic gear 58 having teeth 59, a plastic gear 60 having teeth 61, and a plastic gear 62 having teeth 63. Extending beneath each gear there is a rotatable pipe or hollow tube 64 (preferably stainless steel), a lock collar 66, a bushing 68, a pipe 70 (preferably stainless steel) which is fixed to square tube 72, and a bushing 74. As can be seen, the square tube 72 holds the gear units in position and the other elements permit the gear to rotate. Above each gear is a rotatable plastic piston fixture 76 upon which the piston to be cleaned is mounted or seated. The piston fixture 76 has a top hole or opening 78. Wash water, rinse water, and drying air come up through pipe 64 through opening 78 to wash, rinse, and dry the interior cavity 18 of the piston. Piston fixture 76 slides over pipe 64 and locking flange 80 and is locked in place by a locking pin 84 going through hole 82 in locking flange 80 and corresponding holes in piston fixture 76. Locking pin 84 has a locking pin ring 86 for removing and inserting the locking pin. Locking flange 80 is preferably welded to pipe 64. To accommodate different sized pistons, piston fixture 76 may be unlocked and removed and replaced by a different sized piston fixture.

Figure 4:
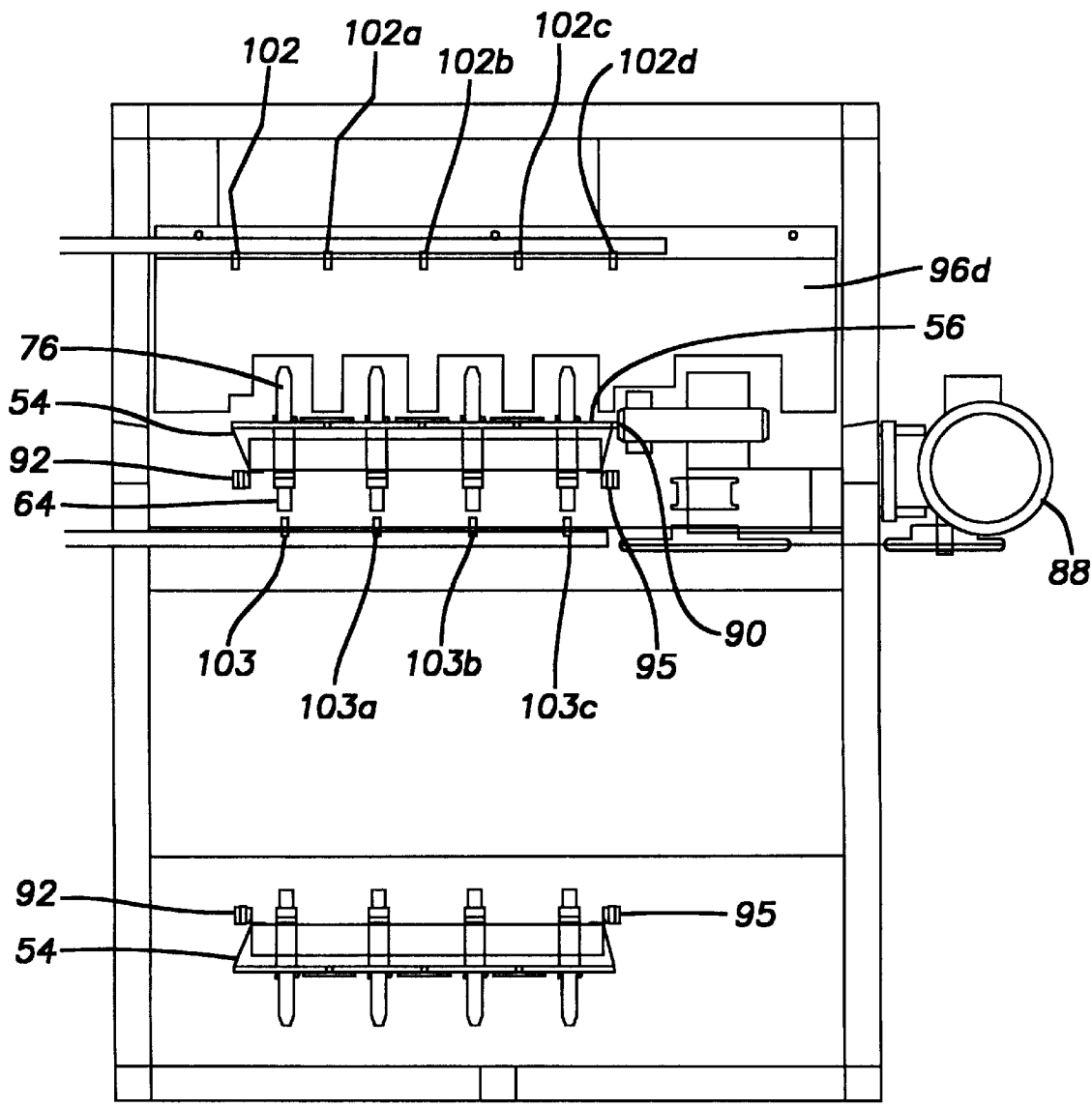
FIG. 4 is a sectional view taken along line 4—4 of FIG. 2.

With reference to FIGS. 2–4, the washing and drying unit 20 is powered by electric motors 88, preferably DC motors, which are connected by chain drive and appropriate gears and sprockets to drive gears 90 (preferably stainless steel) and drive gears 91 (preferably stainless steel). Each of drive gears 90 and drive gears 91 is a drive mechanism. As will be discussed herein, drive gears 91 are in the drying portion of the unit. A large number of carriers 54 are attached to chains 92, 95, to form a conveyor or conveyor belt or conveyor belt arrangement. The conveyor or conveyor belt is driven in the direction shown by arrow 93 by known drive means such as partially illustrated in FIG. 3. A piston, preferably aluminum or cast iron, is mounted dome up on each piston fixture 76, see for example, pistons 94, 94 in FIG. 3. Four pistons are mounted on each carrier, but the number of pistons on the carrier may be more or less.

Heavy plastic sheeting 96a–f is provided to contain washing and rinsing spray as described herein, the sheeting having cut outs shown in FIG. 4 to permit pistons and carriers to move to the next station. Spray nozzles 100–107 are provided to spray wash and rinse water. Each of these nozzles has three or four additional corresponding nozzles, as shown in FIG. 4, where nozzle 102 has corresponding nozzles 102a–d and nozzle 103 has corresponding nozzles 103a–c.

As shown in FIG. 3, the unit 20 includes an air plenum 110. The air plenum 110 extends across the whole width of the carrier conveyor maintaining the same cross sectional profile as shown in FIG. 3. (For clarity the plenum 110 is not shown in FIG. 2). At the bottom of the air plenum 110 are a series of slits 6a–h extending across the width of the carrier conveyor to form air knives where pressurized air is blown out as an air knife to assist in the drying process. Pressurized air tubes 112 provide pressurized air through nozzles 114 to blow off and dry the interior of each piston.

The washing and drying unit 20 operates as follows. Pistons are conveyed single lane, dome down on transfer conveyor 22 to loading end 24 of unit 20. Through the use of rotating wheels or a rotatable plastic paddle contacting or positioned into the bottom or bottom cavity of each piston, each piston which passes through is placed into the same placement direction on the conveyor 22. Pistons are metered into a positioning station where pistons are readied for load to the washer unit. A loading arm grips the pistons near the ring groove location. The arm rotates 180 degrees in an upward arc to place the pistons dome up onto the fixtures 76 of carrier 54. The piston is dome up so water may drain. Once the carrier 54 is loaded with four pistons, the chains 92, 95 move the carrier conveyor or conveyor or conveyor belt forward the width of one carrier and stop again so that the next carrier 54 may be loaded. Thus, the carrier conveyor indexes forward one carrier at a time and stops.

Drive gears 90, 91 are spring-loaded and preferably rotate continuously in a clockwise direction (viewed from the top as in FIG. 2), being driven by electric motors 88. As the carrier conveyor indexes forward and stops, the teeth 57 of metal gear 56 approach and engage the spinning teeth of drive gear 90, 91 and after engagement are driven by gear 90, 91. Gear 90, 91, being spring-loaded, is pushed back slightly by gear 56 during this operation. Gear 56 is driven in a counterclockwise direction (viewed from the top as in FIG. 2). Metal gear 56 then drives plastic gear 58, which drives plastic gear 60, which drives plastic gear 62. In this way, each piston fixture 76 and the piston mounted thereon is rotated or spun. The piston is rotated about its longitudinal axis, which is defined by and is coextensive with the longitudinal axis of pipe 64. Shortly thereafter, when the indexed stop is completed, the carrier 54 starts moving forward to the next station and gear 56 travels forward out of engagement with gear 90, 91, and spring-loaded gear 90, 91 moves slightly forward towards the conveyor, awaiting engagement with the gear 56 of the next carrier 54. The entire carrier conveyor thus indexes forward the width of one carrier and stops and the operation is repeated. As can be seen, the gears on the drag-out or shake off stations 205, 208, 211, 213, 214, can be larger size to increase the speed of the spin and assist in elimination of carry-over of water into the next station.

Less preferably the gears 56 on the carriers 54 can be driven by other drive mechanisms such as an oscillating rack gear driven from an adjacent motor or the gears 56 of all the carriers 54 in the stations can be chain-driven by a single chain (another drive mechanism) which stretches the length of the conveyor or a series of shorter chains, which chain-drive can oscillate or rotate in a single direction. Less preferably a small motor can be mounted on each carrier to drive the gears. All of the drive mechanisms are at the washing and rinsing areas and are adapted to engage the carrier at the area and rotationally drive the piston fixtures 76.

In FIGS. 2–3, the carrier conveyor is shown as having 22 positions or stations (201–222). As can be seen, drive gears 90, 91 are located at positions or stations 201, 204–205, 207–208, 210–214, 216–219, and 222. Thus at each of these stations the pistons are spun or rotated. At station 201, drive gear 90 drives gear 56 to rotate and properly orient the piston fixtures 76, to line them up. This is accomplished by a bolt on a lock collar 66 (preferably the lock collar beneath metal gear 56) which rotates along with a fixture 76. A proximity switch detects the bolt and stops rotation, thus leaving the fixtures 76 properly aligned. This also happens at station 222.

The total cycle time from one station to the next station is 9.6 seconds but is adjustable. If spinning or rotation occurs at a station, spinning takes place for 7.5 seconds; the remaining 2.1 seconds is travel time between stations. At the following stations the speed of rotation of the fixtures 76 and their corresponding pistons, stated in terms of revolutions per second (rps), is as follows (recalling that rotation or spinning occurs for 7.5 seconds at each station): Stations 204, 207, 210, and 212—0.4 rps. Stations 205, 208, and 211—1.2 rps. Stations 213 and 214—3.33 rps (preferably at least 2, more preferably at least 2.5, more preferably at least 3, rps). Stations 216–219—0.2 rps. Stations 201 and 222—0.75 rps until proximity switch activates. These speeds and times are adjustable and may less preferably be in a range ±10%, less preferably in a range ±25%, less preferably in a range ±50%, less preferably in a range ±100%. Preferably the rotation of each piston is continuous in one direction only; far less preferably the rotation may oscillate back and forth between clockwise and counterclockwise, this is stressful on the motors and machine parts.

Station 204 is the high-pressure wash or prewash station, where the pistons are sprayed at more than 60 psi, more preferably at 80 psi, with 110° F.–190° F., more preferably 110° F.–160° F., more preferably 120°F.–150° F. wash solution, the wash solution comprising alkaline or neutral cleaner containing a wetting agent but with no rust inhibitor or silicon-based foam inhibitor or other foam inhibitor, a preferred cleaner being Product ES1000HD from Environmentally Sensitive Solutions, Milwaukee, Wis. (This same wash solution is used at station 207) This step removes additional chips from the ring grooves. The high temperature will help to open the porosity of the piston and allow the high pressure to displace the oils present. Filtering of the prewash tank is provided. Makeup for the prewash tank is provided from the wash tank. Solution level and temperature are sensed and controlled by the control computer. As can be seen, nozzle 101 and corresponding adjacent nozzles 101*a–c* (not shown) spray up through pipe 64 to wash the interior of the piston while nozzle 100, and its corresponding adjacent nozzles 100*a–d* (see FIG. 4) spray and wash the outside of the piston. Note in FIG. 4 that the upper nozzles such as 102, 102*a–d*, are located between and above the pistons so that aqueous solutions can be sprayed both on the top and the side of the pistons. These nozzles can alternatively be lowered so as to be closer to the pistons, but are preferably maintained between the pistons rather than directly above the pistons so that the side walls or skirts of the pistons may be more effectively cleaned. The upper nozzles may be located at other positions or orientations to clean the exterior surfaces of the pistons.

At station 205 the pistons are spun to shake off wash solution to eliminate carry-over of wash solution to the next station. Similar spinning to shake off water occurs at stations 208 and 211.

Station 207 is the wash station, where nozzles 102, 103 and their corresponding nozzles spray wash water at 110° F.–160° F., more preferably 120° F.–150° F., more preferably about 140° F. and 80 psi. Makeup for the wash tank is provided from the rinse tank. Solution level and temperature are sensed and controlled by the control computer. As can be seen, both stations 204 and 207 are washing areas where wash solution is sprayed on the pistons.

Station 210 is a rinse station where nozzles 104, 105 and their corresponding nozzles spray rinse water at 90° F.–130° F., more preferably 100° F.–125° F., more preferably about 120° F. and 60 psi. The rinse water is RO (Reverse Osmosis, 7 pH) water from an RO system. The RO system regeneration and operation is controlled by the control computer. RO water is used to minimize the potential for deposits caused from minerals found in most water. Solution level and temperature are sensed and controlled by the control computer. The prewash and wash tanks have a pH sensor connected to the control computer to maintain proper pH. The RO rinse system has a conductivity probe to maintain cleanliness of the rinse.

Station 212 is the final rinse station where the pistons are sprayed by nozzles 106, 107 with a mist of de-ionized (DI) rinse water at ambient temperature and 60 psi. Input into the DI unit comes from the RO unit output, which has minimal chlorides present. Feeding the DI unit from the RO unit helps prolong the DI unit's life cycles. Overspray from the DI station is caught and used to compensate for evaporative loss in the rinse station. The DI water is mildly acidic (6–7 pH), and will tend to etch the piston lightly and assist in adhesion of the dry film lubricant coating. The DI water will sheet off of the piston easier to minimize potential water spots. The spray of the DI water will also help to normalized and lower the temperature of the pistons. Check valves will be used with the spray nozzles in the final rinse station. Both stations 210 and 212 are rinsing areas.

De-ionization units perform better when process flow is maintained. Thus, the DI output, when not being sprayed, is sent to the RO holding tank to further clean that water. The DI unit is regenerated with sulfuric acid, eliminating the introduction of chlorides which come from the use of hydrochloric acid. Total chlorides present in the DI spray rinse water are less than 0.1 ppm. This low chloride content eliminates the need for rust inhibitors (which are not present in the various aqueous media used in the present invention), which can interfere with proper coating of the piston. Chlorides, left on pistons, will cause oxidation and rust, visible most on cast iron.

Stations 213 and 214 are the high-speed spin stations to throw off the maximum amount of water and moisture from the piston. This spin throws off or eliminates water from the oil holes and ring grooves, as well as most moisture on the surface. The rotational speed can be adjusted as needed to more effectively throw off rinse water. By spinning the water off the pistons, the piston temperature can be lowered during processing.

Stations 216–219 are the drying stations. The drying stations utilize a pressurized air blow-off in combination with rotation of the pistons to complete the drying of the pistons. When the carriers index forward and stop in each of stations 216–219, air plenum 110, which had been raised, is lowered over the pistons while it simultaneously blows pressurized air (temperature 80° F.–160° F., more preferably 90° F.–130° F., more preferably about 110° F.) onto the adjacent pistons through slits 6*a–h*. In the preferred embodiment, the elevated temperature of the air is due only to compression of the air as it is pressurized in a compressor, and not due to any independent heating of the air by such means as gas heating, steam heating, electric resistance heating, etc. Slits 6a–h are essentially air knives. As these air knives are lowered over the slowly rotating pistons, they force the water down and off the piston. During the 7.5 second stop, the air knife makes one pass down and one pass back up. Less preferably it can make two or more passes. As can be seen, the slits are moved with respect to the top of the piston during the blowing step. Less preferably the air plenum can be rotated 90° about its vertical axis so that the air knives run parallel to the conveyor direction of travel. Less preferably the air plenum in this orientation can be fixed rather than raised and lowered. Less preferably other combinations of slits and/or nozzles (all of which are orifices or constriction orifices) can be used to blow air onto the pistons at this drying station. Pressurized air at the same temperature and pressure is also blown up through pipes 64 by nozzles 114 to dry the interior of each piston. At the completion of station 216, air plenum 110 is raised and the carriers index forward one station, where the drive gears 91 reengage and the air plenum 110 again lowers, to repeat the process. As can be seen, each piston is blown and spun in the dryer section at four stations (stations 216–219), and no baking step (such as with air at over 200° F. or at or over 250° F.) is employed in the drying process.

At station 222, an unloading arm configured the same as the loading arm is used to remove the pistons (preferably at about 70–115° F., more preferably about 85–105° F., more preferably about 96° F.) from the carrier and place them dome down onto conveyor 28 where they are shuttled into the coating room 30. In the coating room the skirt of each piston is coated with a dry film lubricant on a piston coating machine as described above, and the coating is then cured in oven 41.

Optionally, an additional set of nozzles and stations can be incorporated between stations 211 and 212 for a ninety-second phosphate coating and rinse.

Although the preferred embodiments have been described, it is understood that various modifications and replacements of the components and methods may be resorted to without departing from the scope of the invention as disclosed and claimed herein.

What is claimed is:

1. A method for washing and drying a piston comprising the steps of:
    providing a piston on a conveyor, said piston having a longitudinal axis,
    carrying said piston on said conveyor to a washing area such that the said piston is mechanically attached to said conveyor,
    at said washing area spraying wash solution on said piston while simultaneously rotating said piston about said longitudinal axis.

2. A method according to claim 1, further comprising carrying said piston on said conveyor from said washing area to a rinsing area and at said rinsing area spraying rinse water on said piston while simultaneously rotating said piston about its longitudinal axis.

3. A method according to claim 2, further comprising a step, after said step of spraying wash solution and before said step of spraying rinse water, of rotating said piston about its longitudinal axis to throw off wash solution.

4. A method according to claim 2, further comprising a step, after said step of spraying rinse water, of rotating said piston about its longitudinal axis at an effective rotational speed to throw off rinse water.

5. A method according to claim 2, further comprising a step, after said step of spraying rinse water, of blowing air against said piston to remove moisture from the surface of said piston.

6. A method according to claim 5, further comprising the step of rotating said piston about its longitudinal axis during said blowing step.

7. A method according to claim 1, said piston having an exterior skirt surface and a bottom cavity surface, at said washing area spraying wash solution on said exterior skirt surface from a first direction and spraying wash solution on said bottom cavity surface from a second direction different from said first direction.

8. A method according to claim 7, further comprising spraying wash solution on said piston from at least one nozzle directed toward said exterior skirt surface, and spraying wash solution on said piston from a second nozzle directed toward said bottom cavity surface.

9. A method according to claim 6, said piston having a skirt, further comprising the steps, after said blowing step, of transporting said piston to an adjacent coating area and at said coating area coating a dry film lubricant onto said skirt of said piston.

10. A method according to claim 9, further comprising the steps, after said coating step, of transporting said piston to an adjacent curing oven and in said oven curing said dry film lubricant coating on said piston skirt.

11. A method according to claim 6, said step of blowing air including a step of blowing air from an orifice, further including the step of moving said orifice with respect to the top of said piston during said blowing step.

12. A method according to claim 2, said rinse water having less than 0.1 ppm chloride content.

13. A method for washing and drying a piston comprising the steps of:
    providing a piston on a conveyor, said piston having a longitudinal axis,
    carrying said piston on said conveyor to a washing area such that the said piston is mechanically attached to said conveyor,
    at said washing area spraying wash solution on said piston,
    after said step of spraying wash solution further comprising a step of spraying rinse water on said piston,
    after said step of spraying rinse water further comprising a step of rotating said piston about its longitudinal axis at an effective rotational speed to throw off rinse water.

14. A method according to claim 13, further comprising a step, after said rotating step, of blowing air against said piston to remove moisture from the surface of said piston.

15. A method according to claim 14, further comprising the step of rotating said piston about its longitudinal axis during said blowing step.

* * * * *